(12) United States Patent
Kim et al.

(10) Patent No.: US 12,124,260 B2
(45) Date of Patent: Oct. 22, 2024

(54) PERSONAL MOBILITY AND CONTROL METHOD THEREOF

(71) Applicants: Hyundai Motor Company, Seoul (KR); Kia Corporation, Seoul (KR)

(72) Inventors: Soobin Kim, Seoul (KR); Jae Yul Woo, Seoul (KR); Seunghyun Woo, Seoul (KR); Rowoon An, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 301 days.

(21) Appl. No.: 17/643,093

(22) Filed: Dec. 7, 2021

(65) Prior Publication Data

US 2022/0197282 A1 Jun. 23, 2022

(30) Foreign Application Priority Data

Dec. 23, 2020 (KR) .................. 10-2020-0182232

(51) Int. Cl.
*G05D 1/00* (2024.01)
*B60W 30/09* (2012.01)
*B60W 50/14* (2020.01)

(52) U.S. Cl.
CPC .......... *G05D 1/0088* (2013.01); *B60W 30/09* (2013.01); *B60W 50/14* (2013.01); *G05D 1/0214* (2013.01);
(Continued)

(58) Field of Classification Search
CPC ............... B60W 30/09; B60W 50/14; B60W 2050/146; B60W 40/076; B60W 2554/00; B60W 2540/18; G05D 2201/0212; B60K 2370/349; B60K 2360/166; B60K 35/10; B60K 2360/563; B60L 2200/24; G06F 3/14; B62J 50/22; B62J 11/00
See application file for complete search history.

(56) References Cited

U.S. PATENT DOCUMENTS 10,789,790 B1 * 9/2020 Vandenbussche .... H02J 7/0048
2011/0133918 A1 * 6/2011 Lee .......................... B62J 50/22
340/436
(Continued)

FOREIGN PATENT DOCUMENTS

CN 107521411 A * 12/2017 .............. B60R 1/00
CN 111919211 A * 11/2020 ........... B60W 50/14
(Continued)

*Primary Examiner* — Khoi H Tran
*Assistant Examiner* — Dairon Estevez
(74) *Attorney, Agent, or Firm* — Slater Matsil, LLP (57) ABSTRACT

An embodiment personal mobility includes a display, a first sensor unit configured to obtain battery state information of the personal mobility, a second sensor unit configured to obtain speed information of the personal mobility, a third sensor unit configured to obtain steering information of the personal mobility, a communicator configured to obtain navigation information, and a controller configured to display a plurality of contents including the navigation information, usage time information of the personal mobility, the battery state information, or the speed information on the display as a basic screen in a plurality of regions in response to an ignition of the personal mobility being turned on and to control to change a screen displayed on the display based on the steering information or the navigation information.

20 Claims, 7 Drawing Sheets

(52) U.S. Cl.
CPC ..... *G05D 1/0274* (2013.01); *B60W 2050/146* (2013.01)

(56) References Cited

U.S. PATENT DOCUMENTS

2017/0334500 A1* 11/2017 Jarek .................. B62J 50/22
2017/0361765 A1* 12/2017 Sung .................. B62J 50/22
2019/0248439 A1* 8/2019 Wang .................. B62K 11/10

FOREIGN PATENT DOCUMENTS

JP           2003285705 A  * 10/2003  ............... B60T 7/22
WO    WO-2015133339 A1 * 9/2015  ......... B60R 16/0233

* cited by examiner

PERSONAL MOBILITY AND CONTROL METHOD THEREOF

CROSS-REFERENCE TO RELATED APPLICATIONS

This application claims the benefit of Korean Patent Application No. 10-2020-0182232, filed on Dec. 23, 2020, which application is hereby incorporated herein by reference.

TECHNICAL FIELD

The disclosure relates to a personal mobility and a control method thereof.

BACKGROUND

As used throughout this application, the phrase "personal mobility" is intended to mean any moving personal vehicle, device, machine, instrument, apparatus, or the like. Recently, the use of a personal mobility such as an electric kickboard, an electric wheel, and an electric bicycle is expanding. The personal mobility may drive on roadways, sidewalks, narrow alleys, and the like by electric power, and may be used as a means of transportation or leisure for moving a short distance.

A personal mobility is a means of transportation for one person powered by electricity, and the frequency of use of the personal mobility is rapidly increasing in recent years. According to this trend, research on the personal mobility is being actively conducted. In particular, as there are many cases in which personal mobility information, navigation information, etc. are intended to be utilized while using the personal mobility, research on this is being actively conducted. When a user looks at a display while using the personal mobility, the user may face various risks while driving. In order to prevent an accident from occurring while the user looks at the display of the personal mobility during driving, the display of the personal mobility needs to be set to be intuitively visible.

Embodiments of the disclosure define a user interface (UI) that users may intuitively and conveniently view in setting a screen of the display.

In addition, research to prevent accidents in advance by giving attention to the user through the UI of the display is being actively conducted.

SUMMARY

An embodiment of the disclosure provides a personal mobility capable of changing a display based on information on various situations including steering information and navigation information, and a control method thereof.

Additional embodiments of the disclosure will be set forth in part in the description which follows and, in part, will be obvious from the description, or may be learned by practice of the disclosure.

In accordance with an embodiment of the disclosure, a personal mobility includes a display, a first sensor unit provided to obtain battery state information of the personal mobility, a second sensor unit provided to obtain speed information of the personal mobility, a third sensor unit provided to obtain steering information of the personal mobility, a communicator provided to obtain navigation information, and a controller configured to display a plurality of contents including at least one of the navigation information, usage time information of the personal mobility, the battery state information, and the speed information on a display as a basic screen in a plurality of regions when an ignition of the personal mobility is turned on, and control to change a screen displayed on the display based on at least one of the steering information and the navigation information.

The controller may determine an expected driving route of the personal mobility based on the navigation information, and may control the display to further display an alarm sign informing of a predetermined situation on the basic screen when the predetermined situation occurs in the personal mobility on the expected driving route within a predetermined distance.

When the personal mobility travels by more than a predetermined distance while a steering direction of the personal mobility is directed to the left by more than a predetermined angle with respect to the front of a main body of the personal mobility based on the steering information, the controller may provide a right direction driving recommendation alarm to a predetermined right region of the display, and may control the display to display a screen corresponding to the basic screen in a region other than the predetermined right region of the display.

When the personal mobility travels by more than a predetermined distance while a steering direction of the personal mobility is directed to the right by more than a predetermined angle with respect to the front of a main body of the personal mobility based on the steering information, the controller may provide a left direction driving recommendation alarm to a predetermined left region of the display, and may control the display to display a screen corresponding to the basic screen in a region other than the predetermined left region of the display.

The personal mobility may further include a fourth sensor unit provided to obtain illuminance information, wherein the controller may control the display to adjust a brightness of the display based on an amount of illuminance obtained from the fourth sensor unit based on the illuminance information.

When a steering direction of the personal mobility is directed to the left or right by more than a predetermined turning angle within a predetermined time with respect to the front of a main body of the personal mobility based on the steering information, the controller may control the display to further display a quick turning warning sign on the basic screen.

The personal mobility may further include a fifth sensor unit provided to detect an external pressure applied to the personal mobility, and a user interface unit provided to receive an input of a user, wherein when the external pressure equal to or greater than a predetermined pressure is measured in the personal mobility based on the fifth sensor unit, the controller may control the display to display at least one of an emergency call sign set such that a call is connected to a preset place when an input of the user is received through the user interface unit, a return sign set to be changed to the previous screen when an input of the user is received through the user interface unit, and a power sign set to turn on/off power of the personal mobility when an input of the user is received through the user interface unit.

When a steering direction of the personal mobility is directed to the left or right by more than a predetermined danger angle exceeding a predetermined turning angle with respect to the front of a main body of the personal mobility based on the steering information, the controller may control the display to display at least one of the emergency call sign set such that a call is connected to a preset place when an input of the user is received through the user interface unit, the return sign set to be changed to the previous screen when an input of the user is received through the user interface unit, and the power sign set to turn on/off power of the personal mobility when an input of the user is received through the user interface unit.

In accordance with an embodiment of the disclosure, a personal mobility includes a display, a first sensor unit provided to obtain battery state information of the personal mobility, a second sensor unit provided to obtain road surface inclination information of the personal mobility, a communicator provided to obtain navigation information, and a controller configured to display a plurality of contents including the navigation information, usage time information of the personal mobility, and the battery state information on a display as a basic screen in a plurality of regions when an ignition of the personal mobility is turned on and control to change a screen displayed on the display based on the road surface inclination information.

In accordance with an embodiment of the disclosure, a control method of a personal mobility includes obtaining battery state information of the personal mobility through a first sensor unit, obtaining speed information of the personal mobility through a second sensor unit, obtaining steering information of the personal mobility through a third sensor unit, obtaining navigation information through a communicator, displaying a plurality of contents including at least one of the navigation information, usage time information of the personal mobility, the battery state information, and the speed information on a display as a basic screen in a plurality of regions when an ignition of the personal mobility is turned on, and controlling the display to change a screen displayed on the display based on at least one of the steering information and the navigation information.

The controlling of the display to change a screen displayed on the display may include determining an expected driving route of the personal mobility based on the navigation information, and controlling the display to further display an alarm sign informing of a predetermined situation on the basic screen when the predetermined situation occurs in the personal mobility within a predetermined distance on the expected driving route.

The controlling of the display to change a screen displayed on the display may include, when the personal mobility travels by more than a predetermined distance while a steering direction of the personal mobility is directed to the left by more than a predetermined angle with respect to the front of a main body of the personal mobility based on the steering information, providing a right direction driving recommendation alarm to a predetermined right region of the display, and controlling the display to display a screen corresponding to the basic screen in a region other than the predetermined right region of the display.

The controlling of the display to change a screen displayed on the display may include, when the personal mobility travels by more than a predetermined distance while a steering direction of the personal mobility is directed to the right by more than a predetermined angle with respect to the front of a main body of the personal mobility based on the steering information, providing a left direction driving recommendation alarm to a predetermined left region of the display, and controlling the display to display a screen corresponding to the basic screen in a region other than the predetermined left region of the display.

The control method may further include obtaining illuminance information through a fourth sensor, and controlling the display to adjust a brightness of the display based on an amount of illuminance obtained from the fourth sensor unit based on the illuminance information.

The controlling of the display to change a screen displayed on the display may include controlling the display to further display a quick turning warning sign on the basic screen when a steering direction of the personal mobility is directed to the left or right by more than a predetermined turning angle within a predetermined time with respect to the front of a main body of the personal mobility based on the steering information.

The control method may further include detecting an external pressure applied to the personal mobility through a fifth sensor unit, and receiving an input of a user through a user interface unit, wherein the controlling of the display to change a screen displayed on the display may include, when the external pressure equal to or greater than a predetermined pressure is measured in the personal mobility based on the fifth sensor unit, controlling the display to display at least one of an emergency call sign set such that a call is connected to a preset place when an input of the user is received through the user interface unit, a return sign set to be changed to the previous screen when an input of the user is received through the user interface unit, and a power sign set to turn on/off power of the personal mobility when an input of the user is received through the user interface unit.

The controlling of the display may include, when a steering direction of the personal mobility is directed to the left or right by more than a predetermined danger angle exceeding a predetermined turning angle with respect to the front of a main body of the personal mobility based on the steering information, controlling the display to display at least one of the emergency call sign set such that a call is connected to a preset place when an input of the user is received through the user interface unit, the return sign set to be changed to the previous screen when an input of the user is received through the user interface unit, and the power sign set to turn on/off power of the personal mobility when an input of the user is received through the user interface unit.

BRIEF DESCRIPTION OF THE DRAWINGS

These and/or other embodiments of the disclosure will become apparent and more readily appreciated from the following description of exemplary embodiments, taken in conjunction with the accompanying drawings, in which.

DETAILED DESCRIPTION OF ILLUSTRATIVE EMBODIMENTS

Like reference numbers refer to like elements throughout this specification. This specification does not describe all components of the embodiments, and general contents in the technical field to which the disclosure belongs or overlapping contents between the embodiments will not be described. The terms "portion," "module," "member," and "block" as used herein, may be implemented as software or hardware, and according to embodiments, a plurality of "portions," "modules," "members," or "blocks" may be implemented as a single component, or a single "portion," "module," "member," or "block" may include a plurality of components.

Throughout this specification, when a portion is "connected" to another portion, this includes the case in which the portion is indirectly connected to the other portion, as well as the case in which the portion is directly connected to the other portion, and the indirect connection includes a connection through a wireless communication network.

Also, it will be understood that the terms "includes," "comprises," "including," and/or "comprising," when used in this specification, specify the presence of a stated component, but do not preclude the presence or addition of one or more other components.

In the present specification, it will also be understood that when an element is referred to as being "on" or "over" another element, it may be directly on the other element or intervening elements may also be present.

It will be understood that, although the terms first, second, etc. may be used herein to describe various components, these components should not be limited by these terms. These terms are only used to distinguish one component from another.

It is to be understood that the singular forms "a," "an," and "the" include plural referents unless the context clearly dictates otherwise.

In each step, an identification numeral is used for convenience of explanation, the identification numeral does not describe the order of the steps, and each step may be performed differently from the order specified unless the context clearly states a particular order.

Hereinafter, the disclosure will be described in detail with reference to the accompanying drawings.

Figure 1:
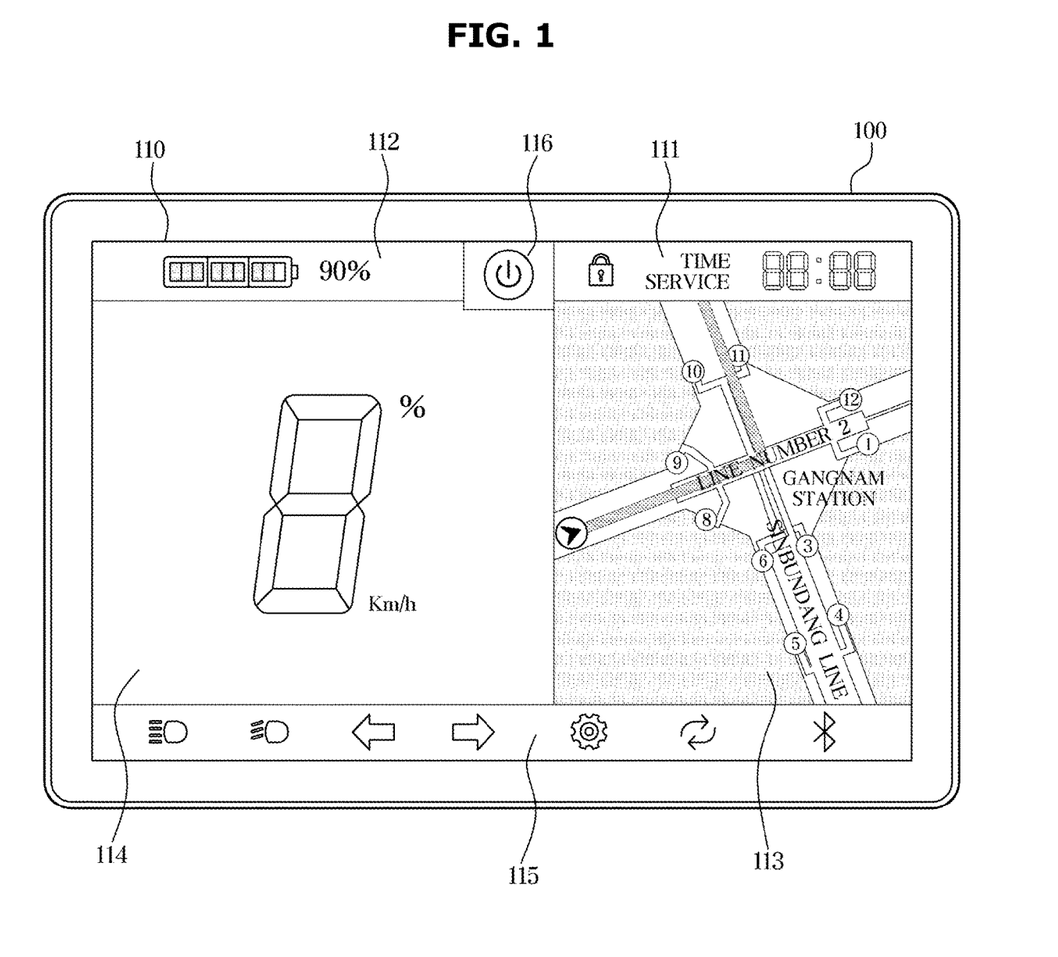
FIG. 1 is a view illustrating a basic screen according to an embodiment.
Figure 2:
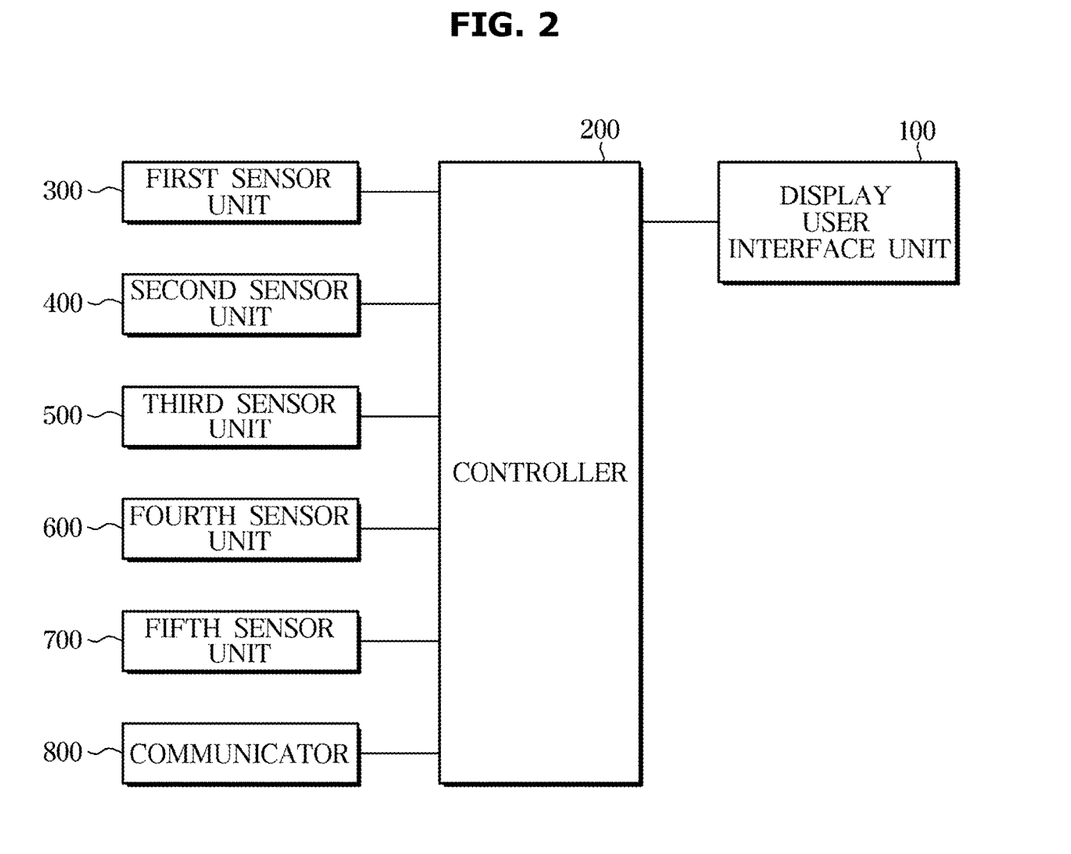
FIG. 2 is a control block diagram of a personal mobility according to an embodiment.

FIG. 1 is a view illustrating a basic screen according to an embodiment, and FIG. 2 is a control block diagram of a personal mobility according to an embodiment.

Referring to FIGS. 1 and 2, a personal mobility may include a display 100, a first sensor unit 300 configured to obtain battery state information of the personal mobility, a second sensor unit 400 configured to obtain speed information of the personal mobility, a third sensor unit 500 configured to obtain steering information of the personal mobility, a communicator 800 configured to obtain navigation information, and a controller 200 configured to display a plurality of contents including at least one of the navigation information, the personal mobility usage time information, the battery state information, and the speed information on the display 100 as a basic screen 110 in a plurality of regions when an ignition of the personal mobility is turned on, and to control the display 100 to change the basic screen 110 based on at least one of the steering information and the navigation information. In this case, not only changing the basic screen 110 but also changing the screen displayed on the display 100 to another screen may also be included. For example, a case of being changed from the basic screen 110 to a screen including a quick turning warning sign screen and then changed back to the basic screen no or changed to another screen may be included.

The personal mobility is a means of transportation for one person powered by electricity, and may include an electric wheel, an electric kickboard, an electric bicycle, a very small electric vehicle, and the like.

The first sensor unit 300 may obtain the battery state information. The first sensor unit 300 may obtain a current output from a battery, a voltage output from the battery, an internal resistance of the battery, temperature information of the battery, and the like, and may also obtain information related to the battery.

The second sensor unit 400 may obtain the speed information of the personal mobility. The second sensor unit 400 may include a personal mobility speed sensor. The personal mobility speed sensor may include a mechanical type and an electrical type.

The third sensor unit 500 may obtain the steering information and road surface inclination information of the personal mobility. The road surface inclination information may mean inclination or slope information of the ground on which the personal mobility is driving. The personal mobility may include a gyro sensor and adaptive cruise control (ACC), and may include a road inclination sensor.

The communicator 800 may obtain the navigation information. The communicator 800 may obtain information on a surrounding situation in addition to the navigation information. For example, when a traffic light changes from a red light to a blue light or from the blue light to the red light on an expected driving route of the personal mobility, information on the corresponding situation may be obtained through the communicator 800, and in addition information on various situations may be obtained through the communicator 800.

The controller 200 may determine an expected driving route of the personal mobility based on the navigation information, and may control the display 100 to further display an alarm sign informing of a predetermined situation on the basic screen 110 when the predetermined situation occurs in the personal mobility on the expected driving route within a predetermined distance. In this case, the occurrence of the predetermined situation within the predetermined distance may include a case in which the traffic light changes from the red light to the blue light or from the blue light to the red light on the expected driving route of the personal mobility, as described above, and may include recognizing that a specific signal is resumed on the expected driving route of the personal mobility and then displaying the specific signal on the display 100. In this case, the alarm sign informing of the predetermined situation may be displayed in the exact center of the screen, may be displayed together with overlapping of another screen, may be displayed with transparency, and may be expressed in various ways. Also, the alarm sign informing of the predetermined situation may be displayed in various ways without being limited to any location, size and method, and the predetermined situation may be notified along with voice guidance through a speaker included in the personal mobility. In addition, alerts for forward attention and signal attention may be notified, and an approximate time of signal resumption may be notified. For example, the sentence "The signal of section A of the three-way intersection in Donggyo-dong will be resumed after about 10 seconds" may be output on the display 100. The section A may mean various sections.

When the ignition of the personal mobility is turned on, the controller 200 may display a plurality of contents including at least one of the navigation information, the personal mobility usage time information, the battery state information, and the speed information in a plurality of regions of the display 100 as the basic screen 110, and may control the display 100 to change the basic screen 110 based on at least one of the steering information and the navigation information. When the ignition of the personal mobility is turned on, that is, when the power is turned on, the basic screen 110 may be displayed on the display 100. In this case, the plurality of contents may be included in the plurality of regions. For example, a screen indicating a state of a battery 112 may be displayed at an upper end of the left side of the display 100 screen, and a power button 116 may be displayed at an upper end of the center. In this case, the power button 116 may be set to turn on and turn off the power of the personal mobility by receiving an input of the user through a user interface.

The display 100 may include the user interface, and a touch of the user may be detected through the display 100. The detection of the touch may be performed by a pressure method or may be performed through the flow of current. A personal mobility usage time 111 may be displayed at an upper end of the right side of the display 100. A personal mobility driving speed 114 may be displayed at the center of the left side of the display 100. A navigation 113 may be displayed at the center of the right side of the display 100. Contents including various information may also be displayed at a lower end 115 of the display 100. For example, various contents such as screen settings, BLUETOOTH™, return to the previous screen, go to the next screen, and setting sign for turning a front high beam on and off or turning a low beam on and off may be included. All contents displayed on the display 100 may receive the input of the user to perform functions of corresponding regions, which may be preset. The disclosure is not limited to the above embodiment, and a plurality of various contents may be displayed in a plurality of regions of the display 100.

Also, the controller 200 may change the basic screen 110 based on at least one of the steering information and the navigation information, and may change the basic screen 110 based on the illumination information in addition to the steering information and the navigation information. In addition, the controller 200 may change the basic screen 110 based on various information, and may change the basic screen 110 according to the input of the user. The change of the basic screen 110 may mean changing the basic screen 110 previously displayed on the display 100. In this case, the change of the basic screen 110 includes not only changing from the basic screen 110, but also changing from a screen changed in the basic screen 110 to another screen and returning to the basic screen 110 from the changed screen on the contrary.

A fourth sensor unit 600 may obtain the illuminance information, and a fifth sensor unit 700 may measure a pressure applied to the personal mobility. The fourth sensor unit 600 may include an illuminance sensor and a light intensity sensor. The fourth sensor unit 600 may include a heat-treated cadmium sulfide (CDS) sensor. This may be based on a principle that as an amount of ambient solar radiation increases, the conductivity increases and the resistance decreases. Also, the fourth sensor unit 600 may include a board. This may be a configuration for controlling a length of a dashboard and sun visor depending on an output value of the sensor. The fourth sensor unit 600 may perform a function of measuring an amount of solar radiation and brightness around a side of the personal mobility to the controller 200 and transmitting the illuminance information to the controller 200. Thereafter, the controller 200 may rearrange a dashboard UI configuration.

The fifth sensor unit 700 may measure the pressure applied to the personal mobility. The fifth sensor unit 700 may include a pressure sensor. The fifth sensor unit 700 may detect that a risk has occurred in the personal mobility, in which the user is currently riding, by measuring the pressure applied to the personal mobility. The personal mobility may include a user interface unit provided to receive the input of the user. The user interface unit may include an input unit. The user interface unit may be included in the display 100. In this case, when a user terminal is placed in the personal mobility, the user interface unit may control the user terminal in the same way as the display 100 by transmitting a signal through the communicator 800 of the personal mobility, as well as the display 100, and may also control the user terminal in the same way as the display 100 using the controller 200. The personal mobility may include a speaker, and an alarm through the speaker may also be notified whenever the screen displayed on the display 100 is changed. This may correspond to all cases when the screen displayed on the display 100 is changed as well as when the display 100 is changed from the basic screen 110. The change of the screen displayed on the display 100 may be changed in various manners, such as omission, addition, and adjustment of a ratio.

The communicator 800 may include one or more components that enable communication with an external device, and may include, for example, at least one of a short-range communication module, a wired communication module, and a wireless communication module.

The short-range communication module may include various short-range communication modules that transmit and receive signals using a wireless communication network in a short distance such as a BLUETOOTH™ module, an infrared communication module, an RFID (radio frequency identification) communication module, a WLAN (wireless local access network) communication module, an NFC (near field communication) module, and a Zigbee communication module.

The wired communication module may include various wired communication modules such as a LAN (local area network) module, a WAN (wide area network) module, and a VAN (value added network) module, as well as various cable communication modules such as a USB (universal serial bus), an HDMI (high definition multimedia interface), a DVI (digital visual interface), an RS-232 (recommended standard 232), power line communication, and a POTS (plain old telephone service).

The wireless communication module, in addition to the Wi-Fi module and the wireless broadband module, may include wireless communication modules supporting various wireless communication methods such as a GSM (global system for mobile communication), a CDMA (code division multiple access), a WCDMA (wideband code division multiple access), a UMTS (universal mobile telecommunications system), a TDMA (time division multiple access), and LTE (long term evolution).

The wireless communication module may include a wireless communication interface including an antenna and a transmitter for transmitting a signal. The wireless communication module may further include a signal conversion module for modulating a digital control signal output from the controller 200 through a wireless communication interface in response to the control of the controller 200 into an analog-type wireless signal. The wireless communication module may include a wireless communication interface including an antenna and a receiver for receiving a signal. In addition, the wireless communication module may further include a signal conversion module for demodulating an analog-type wireless signal received through the wireless communication interface into a digital control signal.

A storage unit may be implemented as at least one of a non-volatile memory device such as a cache, a ROM (read only memory), a PROM (programmable ROM), an EPROM (erasable programmable ROM), an EEPROM (electrically erasable programmable ROM), and a flash memory, a volatile memory device such as a RAM (random access memory), and a storage medium such as a HDD (hard disk drive) and a CD-ROM, but is not limited thereto. The storage unit may be a memory implemented as a separate chip from the processor described above in relation to the controller, and may be implemented as a single chip with the processor.

The display may include a cathode ray tube (CRT), a digital light processing (DLP) panel, a plasma display panel, a liquid crystal display (LCD) panel, an electroluminescence (EL) panel, an electrophoretic display (EPD) panel, an electrochromic display (ECD) panel, a light emitting diode (LED) panel or an organic light emitting diode (OLED) panel. However, the disclosure is not limited thereto.

The input unit may include a hardware device such as various buttons or switches, a pedal, a keyboard, a mouse, a track-ball, various levers, a handle, a stick, and the like for the user's input.

The input unit may also include a graphical user interface (GUI) such as a touch pad for the user's input, that is, a software device. The touch pad may be implemented as a touch screen panel (TSP) to form a layered structure with the display.

When the display is composed of the touch screen panel (TSP) forming a layer structure with the touch pad, the display may also be used as an input unit.

The controller 200 is a processor that controls overall operations of the vehicle and may be a processor of an electronic control unit (ECU) that controls overall operations of a power system. The controller 200 may control operations of various modules and devices installed in the vehicle. According to an embodiment, the controller 200 may generate control signals for controlling various modules and devices installed in the vehicle to control an operation of each component.

The controller 200 may include a memory in which a program for performing the operations described above and to be described later and various data related thereto are stored, and a processor executing the program stored in the memory. The controller 200 may be integrated into a system on chip (SOC) installed in the vehicle and may be operated by the processor. However, not only one SOC may be installed in the vehicle, but a plurality of the SOCs may be installed, and thus the controller 200 is not limited to being integrated into only one SOC.

The controller 200 may be implemented through at least one type of storage medium among a memory type (flash memory type), a hard disk type, a multimedia card micro type, a card type memory (e.g., SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. However, the controller 200 is not limited thereto, and may be implemented as any other form known in the art.

Figure 3:
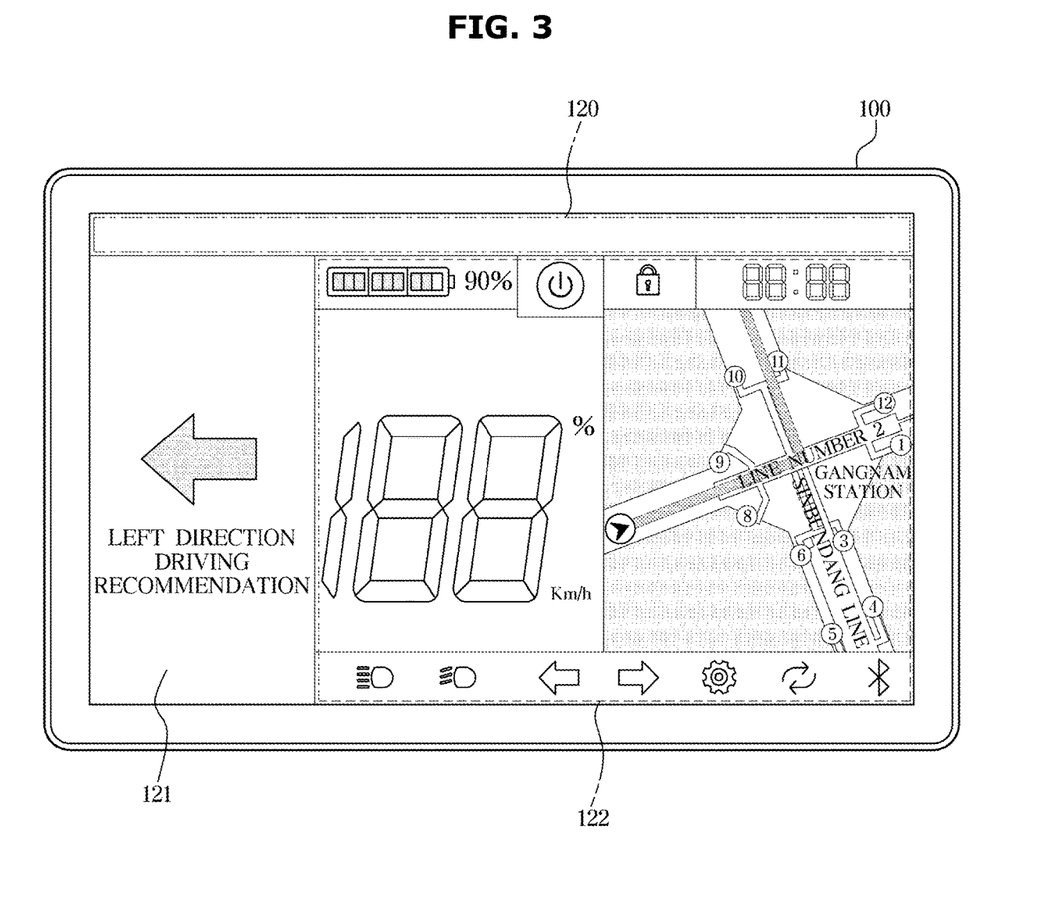
FIG. 3 is a view illustrating a screen when the personal mobility according to an embodiment is being driven in a state of being biased to one side based on the front.

FIG. 3 is a view illustrating a screen when the personal mobility according to an embodiment is being driven in a state of being biased to one side based on the front.

Referring to FIG. 3, when the personal mobility travels by more than the predetermined distance while a steering direction of the personal mobility is directed to the right by more than a predetermined angle with respect to the front of a main body of the personal mobility based on the steering information, the controller 200 may provide a left direction driving recommendation alarm to a predetermined left region of the display 100, and may control the display 100 to display a screen corresponding to the basic screen 122 in a region other than the predetermined left region of the display 100. The controller 200 may finally display a screen 120 including a left direction driving recommendation notification sign 121 on the display 100. For example, when the user drives the personal mobility by more than the predetermined distance while deflecting the personal mobility to the right a lot, the controller 200 may alert the user by providing the left direction driving recommendation notification sign 121 in the left region of the display 100. The reference to the front of the main body may refer to a front direction rather than a vertical direction in a direction in which the main body directs, and this may refer to a traveling direction of the personal mobility that corresponds to the same direction as that of the main body.

In the same context as above, when the personal mobility travels by more than the predetermined distance while the steering direction of the personal mobility is directed to the left by more than the predetermined angle with respect to the front of the main body of the personal mobility based on the steering information, the controller 200 may provide a right direction driving recommendation alarm to a predetermined right region of the display 100, and may control the display 100 to change the basic screen 122 to display a screen corresponding to the basic screen 122 in a region other than the predetermined right region of the display 100. When the personal mobility travels by more than the predetermined distance while being deflected to the left by more than the predetermined angle, it is determined that the steering is biased to the left a lot, so that it may be necessary to recommend driving in the right direction. To this end, it may be necessary to display a right driving recommendation on the right side of the display 100. A ratio of a region occupied by the contents of the left driving recommendation display and right driving recommendation display may correspond to 40% of the total screen ratio, and this is not limited to a specific ratio and may be set to various ratios. In addition, a phrase may appear as the right or left direction driving recommendation display along with an arrow display, and may be displayed in various ways.

Figure 4:
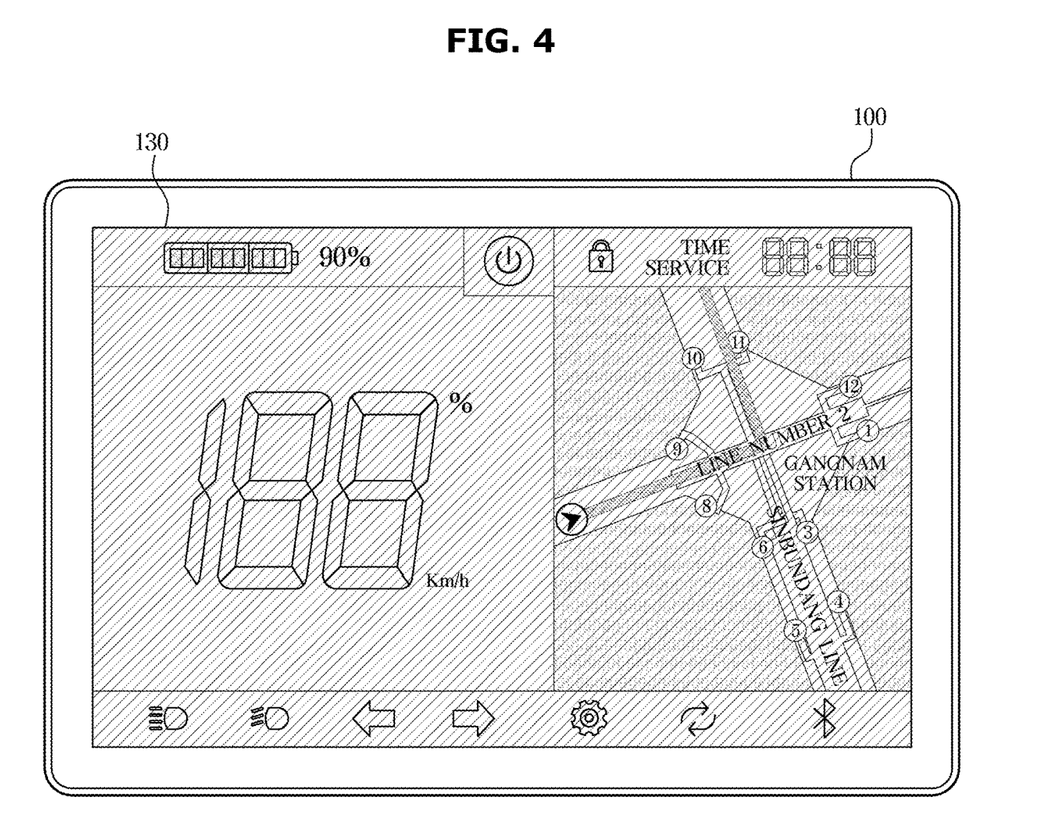
FIG. 4 is a view illustrating an operation of adjusting a brightness of a display based on illuminance information according to an embodiment.

FIG. 4 is a view illustrating an operation of adjusting a brightness of the display 100 based on illuminance information according to an embodiment. Referring to FIG. 4, the personal mobility may further include the fourth sensor unit 600 for obtaining illuminance information, and the controller 200 may control to adjust 130 a brightness of the display 100 based on an amount of illumination obtained from the fourth sensor unit 600 based on the illumination information. This may mean adjusting 130 the brightness of the display 100 to make the display 100 more visible when the illuminance is high depending on the amount of illuminance. For example, when sunlight is too strong, the display 100 may be viewed well by increasing the brightness of the display 100, and conversely, when sunlight is too weak, the brightness of the display 100 may be adjusted to decrease. However, the disclosure is not limited thereto, but when sunlight is strong, the brightness of the display 100 may be adjusted to decrease, and when sunlight is weak, the brightness of the display 100 may be adjusted to increase. These adjustments may be preset and may be set by the user as needed. The case in which sunlight is strong and the case in which sunlight is weak may be included in the case in which the amount of illumination is large and the case in which the amount of illumination is small, as described above.

Figure 5:
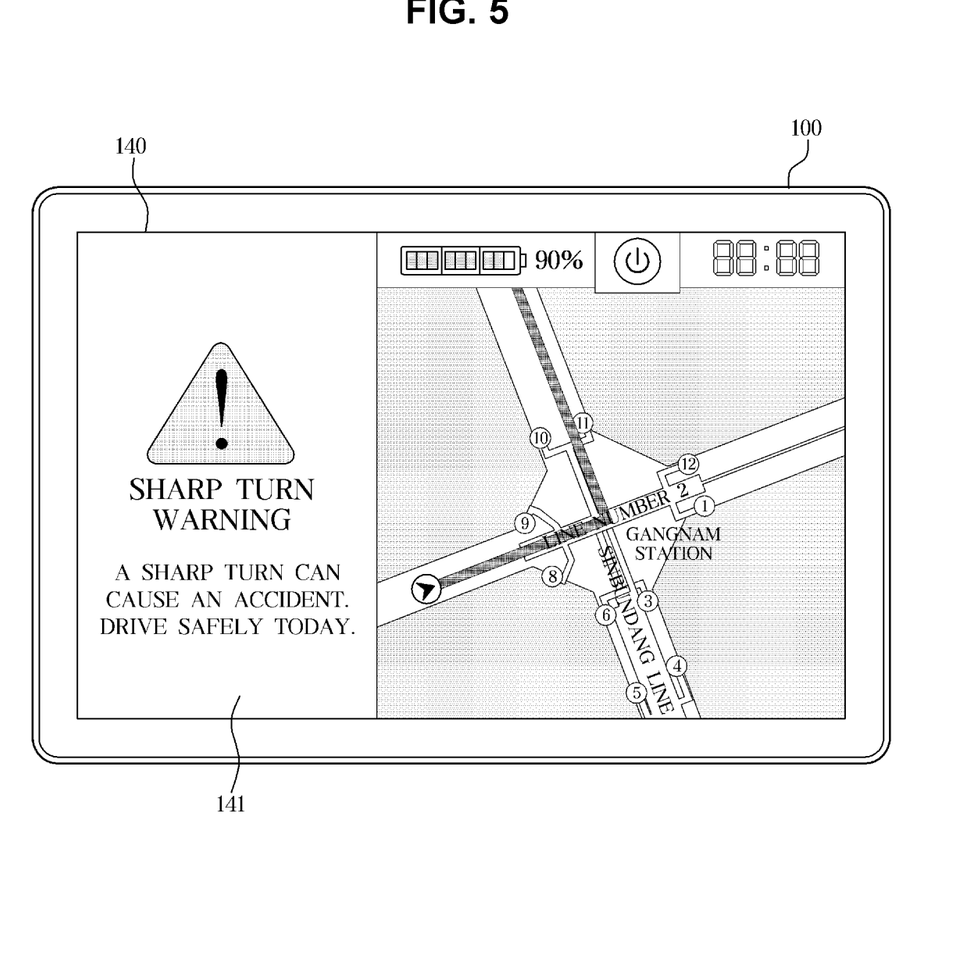
FIG. 5 is a view illustrating an operation of displaying a quick turning warning sign on the display according to an embodiment.

FIG. 5 is a view illustrating an operation of displaying a quick turning warning sign on the display 100 according to an embodiment. Referring to FIG. 5, when the steering direction of the personal mobility is directed to the left or right by more than a predetermined turning angle within the predetermined time with respect to the front of the main body of the personal mobility based on the steering information, the controller 200 may control the display 100 to further display a quick turning warning sign 141 on the basic screen. Finally, the screen 140 including the quick turning warning sign 141 may be displayed. The quick turning refers to a turn generally made with a large turn inclination angle of 45 degrees or more, but is not limited to 45 degrees. Because a dangerous situation may occur when the user quickly turns the direction of the personal mobility a lot while driving, the controller 200 may control to further display the quick turning warning sign 141 on the basic screen. Similarly, the quick turning warning sign 141 may be displayed on the display 100 in various ways. For example, the quick turning warning sign including a triangular shape filled with a red color and having an exclamation point therein and a phrase for warning of the quick turning written below the warning sign may be displayed in the left region of the display 100. At this time, a speed display, GPS, BLUETOOTH™, high beam drive mode, etc. may be omitted for 5 seconds. However, it is not limited to 5 seconds and may be omitted for various times, and the display may be changed depending on a setting without omission.

Figure 6:
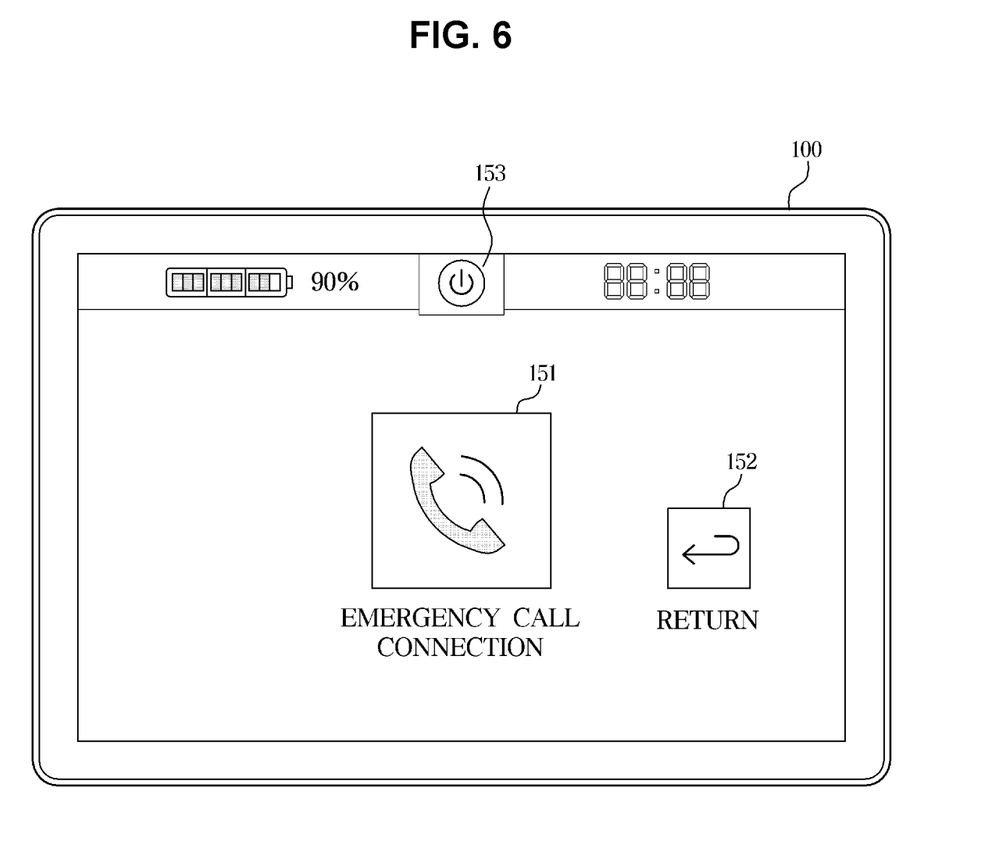
FIG. 6 is a view illustrating an operation of displaying an emergency call connection sign on the display according to an embodiment.

FIG. 6 is a view illustrating an operation of displaying an emergency call connection sign on the display 100 according to an embodiment. Referring to FIG. 6, when an external pressure equal to or greater than a predetermined pressure is measured in the personal mobility based on the fifth sensor unit 700, the controller 200 may control the display 100 to at display at least one of an emergency call sign 151 set such that a call is connected to a preset place when an input of the user is received through the user interface unit, a return sign 152 set to be changed to the previous screen when an input of the user is received through the user interface unit, and a power sign 153 set to turn on/off the power of the personal mobility when an input of the user is received through the user interface unit.

In addition, when the steering direction of the personal mobility is directed to the left or right by more than a predetermined danger angle exceeding the predetermined turning angle with respect to the front of the main body of the personal mobility based on the steering information, the controller 200 may control the display 100 to display at least one of the emergency call sign 151 set such that a call is connected to the preset place when the input of the user is received through the user interface unit, the return sign 152 set to be changed to the previous screen when the input of the user is received through the user interface unit, and the power sign 153 set to turn on/off the power of the personal mobility when the input of the user is received through the user interface unit. For example, it may be set such that an emergency state of the user may be immediately notified to an ambulance, hospital, or people close to the user when the user presses the emergency call connection sign on the screen, and it may be set to return to the previously displayed screen when the user presses the previous button. In this case, in addition to displaying the emergency call connection sign on the display, it may be set such that an emergency call connection is possible immediately when a situation corresponds to the above-described dangerous situation even in a case where there is no emergency call sign or a user touch. When the power button is pressed, the turn on/off of the power may be adjusted, and in this case, when the power button is already displayed on the previous screen, the power button may be displayed larger. The power button may refer to a power sign.

Figure 7:
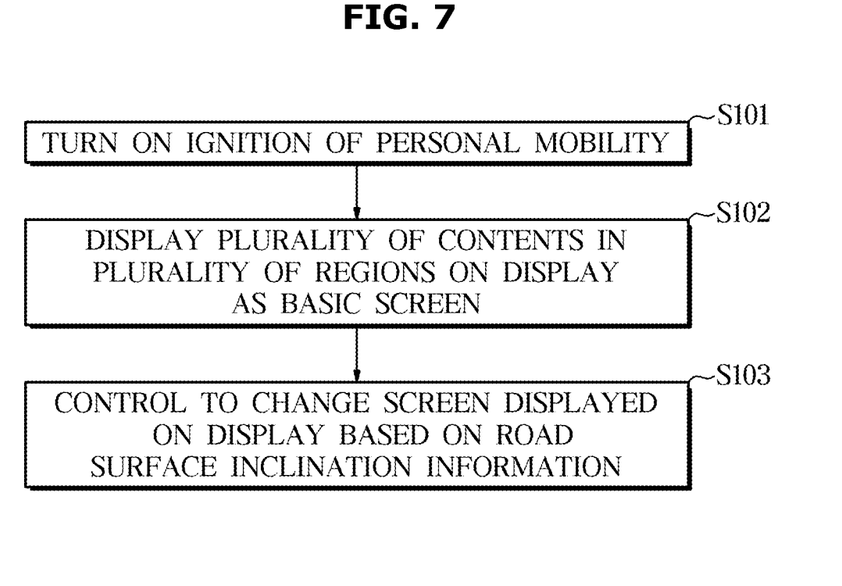
FIG. 7 is a flowchart illustrating an operation of changing the display based on road surface inclination information according to an embodiment.

FIG. 7 is a flowchart illustrating an operation of changing the display based on road surface inclination information according to an embodiment.

Referring to FIG. 7, first, the operation of turning on the ignition of the vehicle, that is, the operation of turning on the ignition of the personal mobility may be performed (Sim), and then, when the ignition is turned on, the plurality of contents may be displayed in the plurality of regions on the display as a basic screen (S102). Descriptions of the plurality of contents, the plurality of regions, and the basic screen are the same as described above. Thereafter, when a ground slope of the vehicle is changed based on the road surface inclination information, the controller 200 may control such that the screen displayed on the display is changed according to the change (S103). In this case, the display change according to the change of the ground slope may include a change in the ratio of the screen, additionally displaying content for the road surface inclination information on the screen, and replacing the content on the basic screen with the road surface inclination information.

Herein, the disclosed embodiments may be implemented in the form of a recording medium storing instructions executable by a computer. The instructions may be stored in the form of program code, and when executed by a processor, a program module may be created to perform the operations of the disclosed embodiments. The recording medium may be implemented as a non-transitory computer-readable recording medium.

The non-transitory computer-readable recording medium includes various kinds of recording media in which instructions which may be decrypted by a computer are stored. For example, there may be a ROM (read only memory), a RAM (random access memory), a magnetic tape, a magnetic disk, a flash memory, an optical data storage device, and the like.

As is apparent from the above, a personal mobility and a control method thereof according to an embodiment of the disclosure can change a display based on information on various situations including steering information and navigation information, so that a user can intuitively use a screen of a display while using the personal mobility, thereby improving user convenience.

The embodiments disclosed with reference to the accompanying drawings have been described above. It will be understood by those skilled in the art that various changes in form and details may be made therein without departing from the spirit and scope of the disclosure as defined by the appended claims. The disclosed embodiments are illustrative and should not be construed as limiting.

What is claimed is:

1. A personal mobility comprising:
  a display;
  a first sensor configured to obtain battery state information of the personal mobility;
  a second sensor configured to obtain speed information of the personal mobility;

a third sensor configured to obtain steering information of the personal mobility;
a communicator configured to obtain navigation information and information on a surrounding situation; and
a controller configured to:
display a plurality of contents comprising the navigation information, usage time information of the personal mobility, the battery state information, or the speed information on the display as a basic screen in a plurality of regions in response to an ignition of the personal mobility being turned on, and
control to change a screen displayed on the display based on the steering information or the navigation information,
wherein, in response to the personal mobility travelling by more than a predetermined distance while a steering direction of the personal mobility is directed to a first side by more than a predetermined angle with respect to a front of a main body of the personal mobility based on the steering information obtained from the third sensor, the controller is configured to:
provide a direction driving recommendation alarm to a predetermined region of the display, and
control the display to further display the screen corresponding to the basic screen in a region other than the predetermined region of the display,
wherein, in response to the steering direction of the personal mobility being directed to the first side by more than a predetermined turning angle within a predetermined time with respect to the front of the main body of the personal mobility based on the steering information obtained from the third sensor, the controller is configured to control the display to further display a quick turning warning sign on the basic screen, and
wherein the predetermined region of the display is a region of a second side of an entire region of the display, and the second side is an opposite side of the first side.

2. The personal mobility according to claim 1, wherein the controller is configured to:
determine an expected driving route of the personal mobility based on the navigation information; and
control the display to further display an alarm sign informing of a predetermined situation on the basic screen in response to the predetermined situation occurring in the personal mobility on the expected driving route within a predetermined distance.

3. The personal mobility according to claim 1, further comprising a fourth sensor configured to obtain illuminance information, wherein the controller is configured to control the display to adjust a brightness of the display based on an amount of illuminance obtained from the fourth sensor based on the illuminance information.

4. The personal mobility according to claim 1, further comprising:
a fifth sensor configured to detect an external pressure applied to the personal mobility; and
a user interface device configured to receive an input of a user.

5. The personal mobility according to claim 4, wherein, in response to the external pressure being equal to or greater than a predetermined pressure in the personal mobility based on the fifth sensor, the controller is configured to control the display to display an emergency call sign set such that a call is connected to a preset place when the input of the user is received through the user interface device, a return sign set to be changed to a previous screen when the input of the user is received through the user interface device, or a power sign set to turn on/off power of the personal mobility when the input of the user is received through the user interface device.

6. The personal mobility according to claim 4, wherein, in response to the steering direction of the personal mobility being directed left or right by more than a predetermined danger angle exceeding a predetermined turning angle with respect to the front of the main body of the personal mobility based on the steering information, the controller is configured to control the display to display an emergency call sign set such that a call is connected to a preset place when the input of the user is received through the user interface device, a return sign set to be changed to a previous screen when the input of the user is received through the user interface device, or a power sign set to turn on/off power of the personal mobility when the input of the user is received through the user interface device.

7. A control method of a personal mobility, the control method comprising:
obtaining battery state information of the personal mobility through a first sensor;
obtaining speed information of the personal mobility through a second sensor;
obtaining steering information of the personal mobility through a third sensor;
obtaining navigation information and information on a surrounding situation through a communicator;
displaying a plurality of contents comprising the navigation information, usage time information of the personal mobility, the battery state information, or the speed information on a display as a basic screen in a plurality of regions in response to an ignition of the personal mobility being turned on; and
controlling the display to change a screen displayed on the display based on the steering information or the navigation information,
wherein controlling the display to change the screen displayed on the display comprises:
determining that the personal mobility travels by more than a predetermined distance while a steering direction of the personal mobility is directed to a first side by more than a predetermined angle with respect to a front of a main body of the personal mobility based on the steering information obtained from the third sensor;
providing a direction driving recommendation alarm to a predetermined region of the display in response to the determining; and
controlling the display to display the screen corresponding to the basic screen in a region other than a predetermined right region of the display,
wherein controlling the display to change the screen displayed on the display comprises controlling the display to further display a quick turning warning sign on the basic screen in response to the steering direction of the personal mobility being directed to the first side by more than a predetermined turning angle within a predetermined time with respect to the front of the main body of the personal mobility based on the steering information obtained from the third sensor, and
wherein the predetermined region of the display is a region of a second side of an entire region of the display, and the second side is an opposite side of the first side.

8. The control method according to claim 7, wherein controlling the display to change the screen displayed on the display comprises:
   determining an expected driving route of the personal mobility based on the navigation information; and
   controlling the display to further display an alarm sign informing of a predetermined situation on the basic screen in response to the predetermined situation occurring in the personal mobility within a predetermined distance on the expected driving route.

9. The control method according to claim 7, further comprising:
   obtaining illuminance information through a fourth sensor; and
   controlling the display to adjust a brightness of the display based on an amount of illuminance obtained from the fourth sensor based on the illuminance information.

10. The control method according to claim 7, further comprising:
    detecting an external pressure applied to the personal mobility through a fifth sensor; and
    receiving an input of a user through a user interface device.

11. The control method according to claim 10, wherein controlling the display to change the screen displayed on the display comprises:
    determining that the external pressure is equal to or greater than a predetermined pressure in the personal mobility based on the fifth sensor; and
    controlling the display to display an emergency call sign set such that a call is connected to a preset place when the input of the user is received through the user interface device, a return sign set to be changed to a previous screen when the input of the user is received through the user interface device, or a power sign set to turn on/off power of the personal mobility when the input of the user is received through the user interface device.

12. The control method according to claim 10, wherein controlling the display comprises:
    determining that the steering direction of the personal mobility is directed left or right by more than a predetermined danger angle exceeding a predetermined turning angle with respect to the front of the main body of the personal mobility based on the steering information; and
    in response to the determining, controlling the display to display an emergency call sign set such that a call is connected to a preset place when the input of the user is received through the user interface device, a return sign set to be changed to a previous screen when the input of the user is received through the user interface device, or a power sign set to turn on/off power of the personal mobility when the input of the user is received through the user interface device.

13. The personal mobility according to claim 1, wherein the first side is the right side, and the second side is the left side.

14. The personal mobility according to claim 1, wherein the first side is the left side, and the second side is the right side.

15. The control method according to claim 7, wherein the first side is the right side, and the second side is the left side.

16. The control method according to claim 7, wherein the first side is the left side, and the second side is the right side.

17. A personal mobility comprising:
    a display;
    a first sensor configured to obtain battery state information of the personal mobility;
    a second sensor configured to obtain speed information of the personal mobility;
    a third sensor configured to obtain steering information of the personal mobility;
    a communicator configured to obtain navigation information and information on a surrounding situation;
    a processor; and
    a memory with instructions stored therein, wherein the instructions, when executed by the processor, enable the processor to:
        display a plurality of contents comprising the navigation information, usage time information of the personal mobility, the battery state information, or the speed information on the display as a basic screen in a plurality of regions in response to an ignition of the personal mobility being turned on, and
        control to change a screen displayed on the display based on the steering information or the navigation information,
    wherein, in response to the personal mobility travelling by more than a predetermined distance while a steering direction of the personal mobility is directed to a first side by more than a predetermined angle with respect to a front of a main body of the personal mobility based on the steering information obtained from the third sensor, the controller is configured to:
        provide a direction driving recommendation alarm to a predetermined region of the display, and
        control the display to further display the screen corresponding to the basic screen in a region other than the predetermined region of the display,
    wherein, in response to the steering direction of the personal mobility being directed to the first side by more than a predetermined turning angle within a predetermined time with respect to the front of the main body of the personal mobility based on the steering information obtained from the third sensor, the controller is configured to control the display to further display a quick turning warning sign on the basic screen, and
    wherein the predetermined region of the display is a region of a second side of an entire region of the display, and the second side is an opposite side of the first side.

18. The personal mobility according to claim 17, wherein the instructions, when executed by the processor, further enable the processor to:
    determine an expected driving route of the personal mobility based on the navigation information; and
    control the display to further display an alarm sign informing of a predetermined situation on the basic screen in response to the predetermined situation occurring in the personal mobility on the expected driving route within a predetermined distance.

19. The personal mobility according to claim 17, wherein the first side is the right side, and the second side is the left side.

20. The personal mobility according to claim 17, wherein the first side is the left side, and the second side is the right side.

* * * * *